(12) United States Patent
Uchida

(10) Patent No.: US 8,065,723 B2
(45) Date of Patent: Nov. 22, 2011

(54) NETWORK COMMUNICATION DEVICE

(75) Inventor: Takayuki Uchida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 946 days.

(21) Appl. No.: 12/033,686

(22) Filed: Feb. 19, 2008

(65) Prior Publication Data

US 2008/0282082 A1 Nov. 13, 2008

(30) Foreign Application Priority Data

Feb. 20, 2007 (JP) ................................. 2007-039448

(51) Int. Cl.
*H04L 12/00* (2006.01)
*H04L 12/22* (2006.01)
(52) U.S. Cl. ............... 726/14; 709/221; 709/228; 714/3
(58) Field of Classification Search .................... 726/14; 714/4
See application file for complete search history.

(56) References Cited

U.S. PATENT DOCUMENTS

| 6,021,262 | A * | 2/2000 | Cote et al. ................. | 714/48 |
| 7,069,473 | B2 * | 6/2006 | Yasuda ..................... | 714/37 |
| 2001/0042201 | A1 | 11/2001 | Yamaguchi et al. | |
| 2002/0188871 | A1 * | 12/2002 | Noehring et al. ............. | 713/201 |
| 2003/0149889 | A1 * | 8/2003 | Wookey et al. ............... | 713/200 |
| 2006/0031928 | A1 * | 2/2006 | Conley et al. .................. | 726/11 |
| 2006/0041936 | A1 * | 2/2006 | Anderson et al. .............. | 726/11 |

FOREIGN PATENT DOCUMENTS

| JP | 2001-298449 | 10/2001 |
| JP | 2006-20262 | 1/2006 |
| JP | 2006-20266 | 1/2006 |
| JP | 2007-135082 | 5/2007 |
| JP | 2007-135083 | 5/2007 |

* cited by examiner

*Primary Examiner* — Kambiz Zand
*Assistant Examiner* — Imhotep Durham
(74) *Attorney, Agent, or Firm* — Cooper & Dunham LLP

(57) ABSTRACT

A disclosed network communication device corresponds to IP communications and is capable of performing IPsec communication. The network communication device includes a setting unit configured to obtain and set an operation mode specified by an administrator user; a detecting unit configured to detect a communication error caused by an incorrect portion in an IPsec setting; and a changing unit configured to change the IPsec setting, based on the operation mode set by the setting unit, to correct the incorrect portion or to cancel the IPsec communication, in the event that the communication error is detected.

20 Claims, 19 Drawing Sheets

| ENTRY NO. | LOCAL IP ADDRESS | REMOTE IP ADDRESS | IPsec SETTING (PLURAL ENTRIES ACCEPTABLE) | IPsec REMOTE SETTING CHANGING FUNCTION | IPsec AUTOMATIC CORRECTION MODE |
|---|---|---|---|---|---|
| 1 | 192.168.2.2/32 | 192.168.2.3/32 | ... | VALID | VALID |
| 2 | 192.168.2.2/32 | 192.168.2.10/32 | ... | VALID | INVALID |
| 3 | 192.168.2.2 | 192.168.2.1/32 | ... | INVALID | — |
| ... | ... | ... | ... | ... | ... |

FIG.5

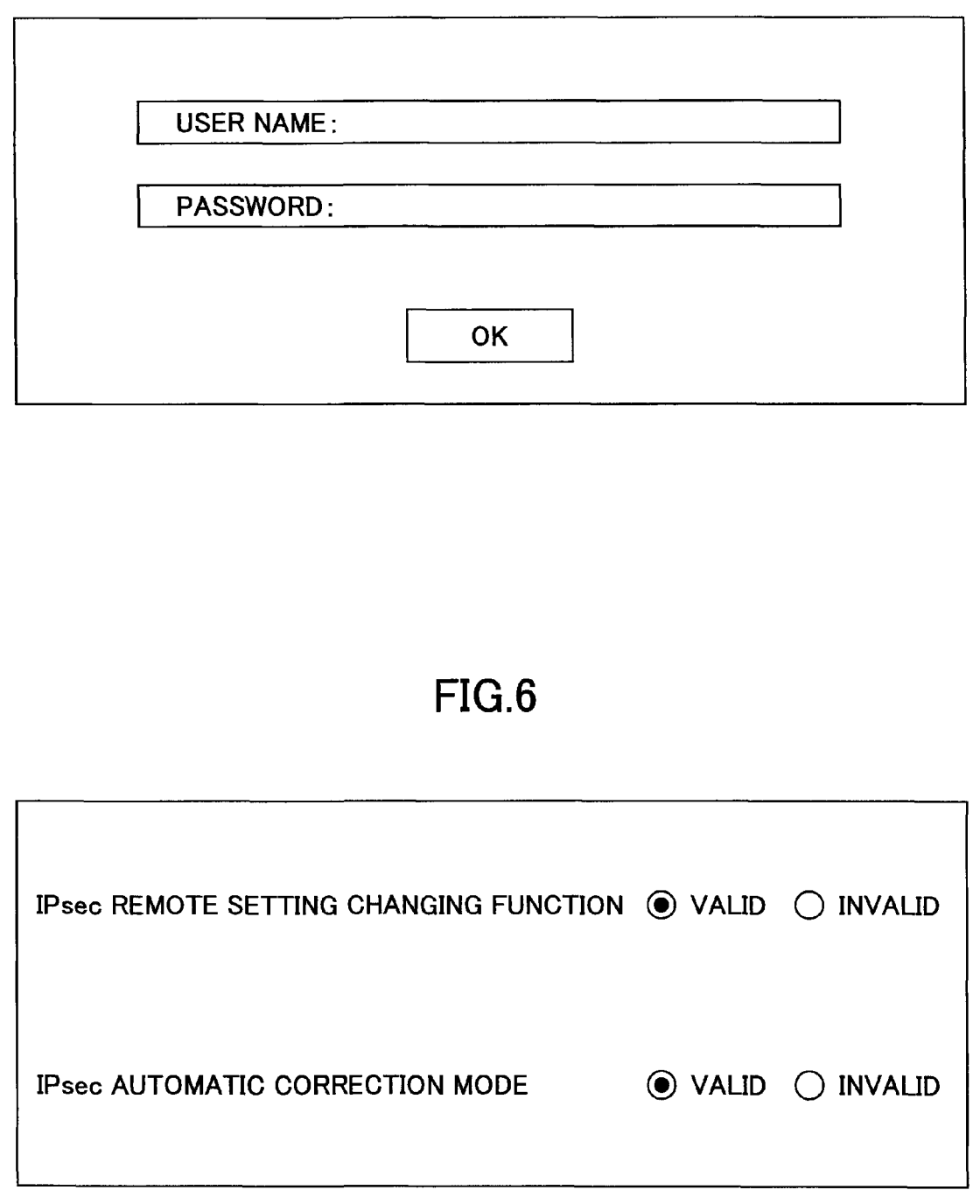

| USER NAME : |
| PASSWORD : |

IPsec REMOTE SETTING CHANGING FUNCTION  ● VALID  ○ INVALID

IPsec AUTOMATIC CORRECTION MODE  ● VALID  ○ INVALID

FIG.12

| EXCHANGE OF KEY | ○ MANUAL | ⦿ AUTOMATIC | | |
|---|---|---|---|---|
| IKE Mode | ⦿ MAIN | ○ AGGRESSIVE | | |
| IKE AUTHENTICATION METHOD | ⦿ PRIOR SHARED SECRET KEY | ○ DIGITAL SIGNATURE AUTHENTICATION | ○ PUBLIC KEY AUTHENTICATION ENCRYPTION | ○ MODIFIED PUBLIC KEY ENCRYPTION |
| KEY PHRASE | ********** | | | |
| IKE ENCRYPTION ALGORITHM | ⦿ DES-CBC | ⦿ AES-CBC  ―P | | |
| IKE HASH ALGORITHM | ⦿ MD5 | ○ SHA1 | | |
| DH GROUP | ⦿ 1 | ⦿ 2 | | |
| AH AUTHENTICATION ALGORITHM | ⦿ HMAC-MD5 | ○ HMAC-SHA1 | | |
| ESP ENCRYPTION ALGORITHM | ⦿ NULL | ○ DES-CBC | ○ AES-CBC | |
| ESP AUTHENTICATION ALGORITHM | ⦿ HMAC-MD5 | ○ HMAC-SHA1 | | |
| PFS GROUP | ⦿ DO NOT USE | ○ 768bit | ○ 1024bit | |

FIG.15

| | 122 |
|---|---|
| IPsec UNSUCCESSFUL ACCESS REPORT FUNCTION | VALID |
| IP ADDRESS/HOST NAME OF ADMINISTRATOR | 192.168.2.3 |
| MAXIMUM NUMBER OF UNSUCCESSFUL ACCESSES | 5 |
| NUMBER OF UNSUCCESSFUL ACCESSES | 2 |
| IPsec CANCEL ADDRESS FUNCTION | VALID |
| ... | ... |

FIG.20

| HOST NAME | IP ADDRESS | IPsec STATUS | |
|---|---|---|---|
| Server1 | 2001:1:2:3:200:22ff:fe33:6666 | VALID | IPsec CANCEL |
| Server2 | 2001:4:5:6:200:22ff:fe33:6666 | VALID | IPsec CANCEL |

NETWORK COMMUNICATION DEVICE

BACKGROUND OF THE INVENTION

1. Field of the Invention

The present invention relates to a network communication device including an encryption communication function such as IPsec.

2. Description of the Related Art

There is a technology referred to as IPsec (Internet Protocol security), which is a specification for safely performing communications via the Internet. IPsec is specified by plural RFCs, primarily based on RFC (Request For Comment) 4301.

A brief description of IPsec is given below.

The following functions can be realized with IPsec.

Access control: Connection is authorized or unauthorized based on an address, etc., of the connection source.

Insurance of completeness of communication data: It is insured that the communication data are not falsified in the middle of a communication path.

Confidentiality of communication contents: The communication data are encrypted, so that even if the communication data are intercepted in the middle of a communication path, it will not be easy to recognize the communication contents.

To realize the above functions, the IPsec is configured with plural technologies.

The IPsec employs security protocols referred to as AH (Authentication Header) and ESP (Encapsulating Security Payload). AH is used for authentication (insurance of completeness) and ESP is used for encryption (realization of confidentiality of data). AH is specified by RFC4302 and ESP is specified by RFC4303. AH and ESP respectively have two modes, i.e., a transport mode and a tunnel mode. In the transport mode, the process target of the security protocol is the payload portion of IP. In the tunnel mode, the process target is the entire IP packet.

With IPsec, a parameter set referred to as SA (Security Association) is used for managing keys and encryption algorithms. A database for managing SA is referred to as SAD (Security Association Database). Parameters of SA include an identifier for two points between which communication is to be established, SPI (Security Parameter Index), the type of security protocol, the encryption algorithm and its key, the duration of SA, a value of IV (Initialization Vector) used for the encryption algorithm, and a counter. The SA has a direction, and therefore two SAs are required for performing bidirectional communication.

A security policy generally refers to an action guideline indicating "how" to protect "what" from "whom". The SP (security policy) in IPsec indicates whether to apply IPsec to a particular kind of IP packet. Parameters of SP include an IP layer protocol number, an IP address, a network address, a transport layer protocol, a port number, and an identifier of the user. A database for managing SP is referred to as SPD (Security Parameter Database).

IPsec is used for various network communication devices including image forming apparatuses such as MFPs (Multi Function Printer) (see, for example, Patent Document 1).

Patent Document 1: Japanese Laid-Open Patent Application No. 2006-20266

In order to perform IPsec communication, the user (administrator or general user) is required to make complex settings. If there is a mistake (an incorrect portion) in the settings, it will not be possible to use the same IP address again to perform communication unless IPsec communication is cancelled. For this reason, if IPsec communication settings have been made from a remote location, the user may need to actually go to the site where the target device is installed to cancel IPsec communication.

SUMMARY OF THE INVENTION

The present invention provides a network communication device in which one or more of the above-described disadvantages are eliminated.

A preferred embodiment of the present invention provides a network communication device capable of appropriately responding to a case where IPsec communication is disabled due to an incorrect portion in the settings for IPsec.

An embodiment of the present invention provides a network communication device corresponding to IP communication and capable of performing IPsec communication, the network communication device including a setting unit configured to obtain and set an operation mode specified by an administrator user; a detecting unit configured to detect a communication error caused by an incorrect portion in an IPsec setting; and a changing unit configured to change the IPsec setting, based on the operation mode set by the setting unit, to correct the incorrect portion or to cancel the IPsec communication, in the event that the communication error is detected.

An embodiment of the present invention provides an IPsec setting error recovery control method performed by a network communication device corresponding to IP communication and capable of performing IPsec communication, the IPsec setting error recovery control method including a setting step of obtaining and setting an operation mode specified by an administrator user; a detecting step of detecting a communication error caused by an incorrect portion in an IPsec setting; and a changing step of changing the IPsec setting, based on the operation mode set at the setting step, to correct the incorrect portion or to cancel the IPsec communication, in the event that the communication error is detected.

An embodiment of the present invention provides an IPsec setting error recovery control program product for controlling a network communication device corresponding to IP communication and capable of performing IPsec communication, the IPsec setting error recovery control program product including instructions for causing a computer to perform a setting step of obtaining and setting an operation mode specified by an administrator user; a detecting step of detecting a communication error caused by an incorrect portion in an IPsec setting; and a changing step of changing the IPsec setting, based on the operation mode set at the setting step, to correct the incorrect portion or to cancel the IPsec communication, in the event that the communication error is detected.

According to one embodiment of the present invention, a network communication device is provided, which is capable of appropriately responding to a case where IPsec communication is disabled due to an incorrect portion in the settings for IPsec.

BRIEF DESCRIPTION OF THE DRAWINGS

Other objects, features and advantages of the present invention will become more apparent from the following detailed description when read in conjunction with the accompanying drawings, in which:

FIG. 5 illustrates an example of a login page;

FIG. 6 illustrates an example of a setting page;

FIG. 12 illustrates an example of a page displaying incorrect portions;

FIG. 15 illustrates a user setting holding table (a part that corresponds to an IPsec unsuccessful access report function);

FIG. 20 illustrates a page displayed on the side that has received the unsuccessful access report.

DETAILED DESCRIPTION OF THE PREFERRED EMBODIMENTS

A description is given, with reference to the accompanying drawings, of an embodiment of the present invention.

First Embodiment

In a first embodiment of the present invention, if an error occurs due to a mistake (an incorrect portion) in the settings for IPsec, the incorrect portion in the settings will be identified and the setting of the IPsec will be automatically corrected, or the incorrect portion in the IPsec settings will be displayed to a user so that the user can manually correct the incorrect portion. Accordingly, IPsec connection can be reliably performed. This configuration is not dependent on the version of the IP address (e.g., IPv4 (Internet Protocol version 4), IPv6 (Internet Protocol version 6)).

Figure 1:
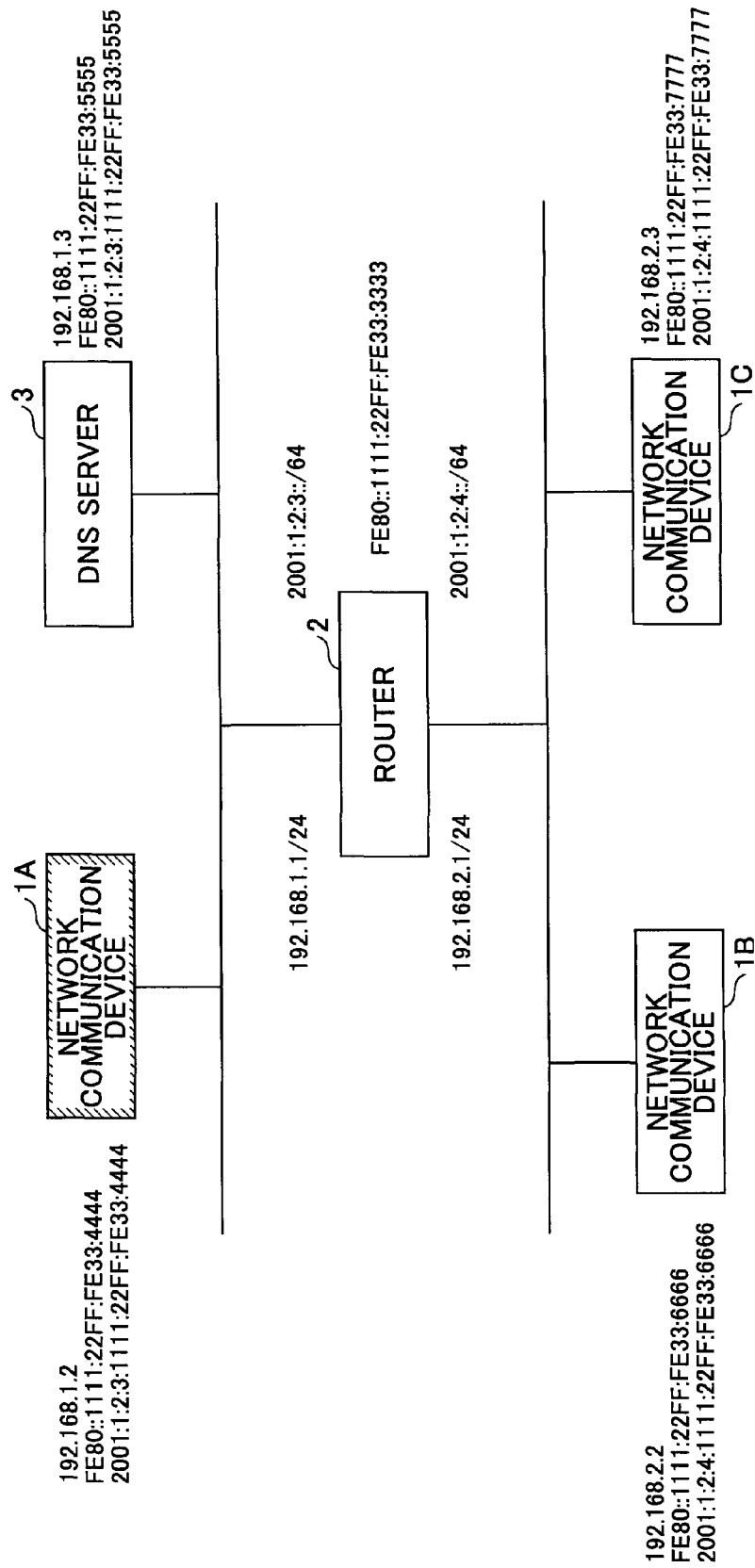
FIG. 1 illustrates a network configuration according to a first embodiment of the present invention.

FIG. 1 illustrates a network configuration according to the first embodiment of the present invention.

In FIG. 1, it is assumed that an MFP, a PC (Personal Computer), network communication devices 1A through 1C such as servers, a router 2, and a DNS (Domain Name System) server 3 are connected to a network. For the sake of description, it is assumed that the network communication device 1A includes functions corresponding to an embodiment of the present invention. Incidentally, the router 2 and the DNS server 3 are also network communication devices, and therefore an embodiment of the present invention can also be applied thereto.

Each device is given an IP address (IPv4/IPv6). In the IPv4 version, the IP address includes 32 bits that appear as decimal digits. In the IPv6 version (when implemented), the IP address will include 128 bits that appear as hexadecimal digits. In the case of IPv4, each device is usually given one IP address. In the case of IPv6, each device is usually given a link local address as well as a stateless address. This is because with a link local address, communication can be performed only with devices within the same network. In order to communicate with devices over the router, a global address is necessary; the stateless address corresponds to the global address.

Figure 2:
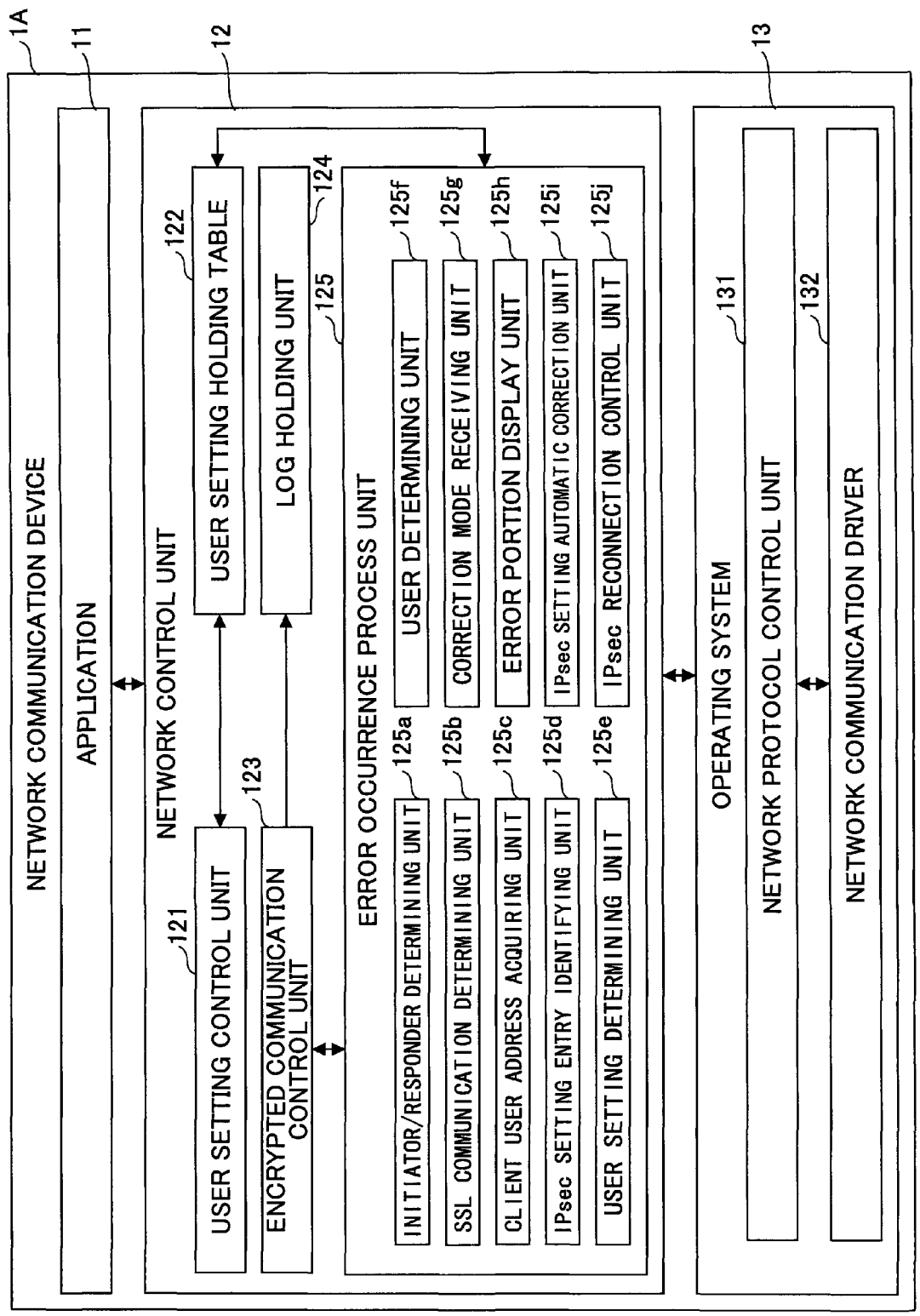
FIG. 2 is a block diagram of a network communication device.

FIG. 2 is a block diagram of the network communication device 1A.

As shown in FIG. 2, the network communication device 1A includes an application 11 for providing functions of a Web server, etc., a network control unit 12 for controlling communications performed via a network, and an operating system 13 that is the basic software.

The network control unit 12 includes a user setting control unit 121 for controlling user settings concerning network control via the application 11, a user setting holding table 122 for holding contents of user settings, an encrypted communication control unit 123 for controlling encrypted communication by IPsec or SSL (Secure Socket Layer) communication, a log holding unit 124 for holding a log of an error that has occurred in the encrypted communications, and an error occurrence process unit 125 for performing a special process in the event that an error occurs when IPsec is started (when a negotiation is performed for security information with ISAKMP (Internet Security Association Key Management Protocol)), which error is caused by an incorrect portion in the IPsec settings. The log holding unit 124 can be provided inside the operating system 13, so that errors that have occurred at the time of encrypted communication, which errors are detected at the level of the operating system 13, are recorded in the log.

The error occurrence process unit 125 includes an initiator/responder determining unit 125a for determining whether the device to which it belongs (self-device) is the initiator side (the side that initiates negotiation) or the responder side (the side that responds to the negotiation), an SSL communication determining unit 125b for determining whether SSL communication is possible, a client user address acquiring unit 125c for acquiring the address (client user address) of the client side with which connection is made by SSL communication, an IPsec setting entry identifying unit 125d for identifying an IPsec setting entry from the client user address, and a user setting determining unit 125e for determining the contents of a user setting from an IPsec setting entry.

The error occurrence process unit 125 further includes a user determining unit 125f for determining whether the user is an administrator based on login information to the SSL communication or login information to the self-device, a correction mode receiving unit 125g for receiving a posterior selection of a correction mode (automatic correction/manual correction) from the administrator, an error portion display unit 125h for displaying, to the user, the error portion in the IPsec settings (for a remote user, it sends the display data and causes the display data to be displayed; for a user of the self-device, it displays the display data on an operations panel), an IPsec setting automatic correction unit 125i for automatically correcting an error portion in the IPsec settings in the case of an IPsec automatic correction mode, and an IPsec reconnection control unit 125*j* for performing IPsec reconnection after automatically correcting the error portion.

The operating system 13 includes a network protocol control unit 131 for controlling communications in accordance with a specific network protocol and a network communication driver 132 for controlling communication hardware.

Figure 3:
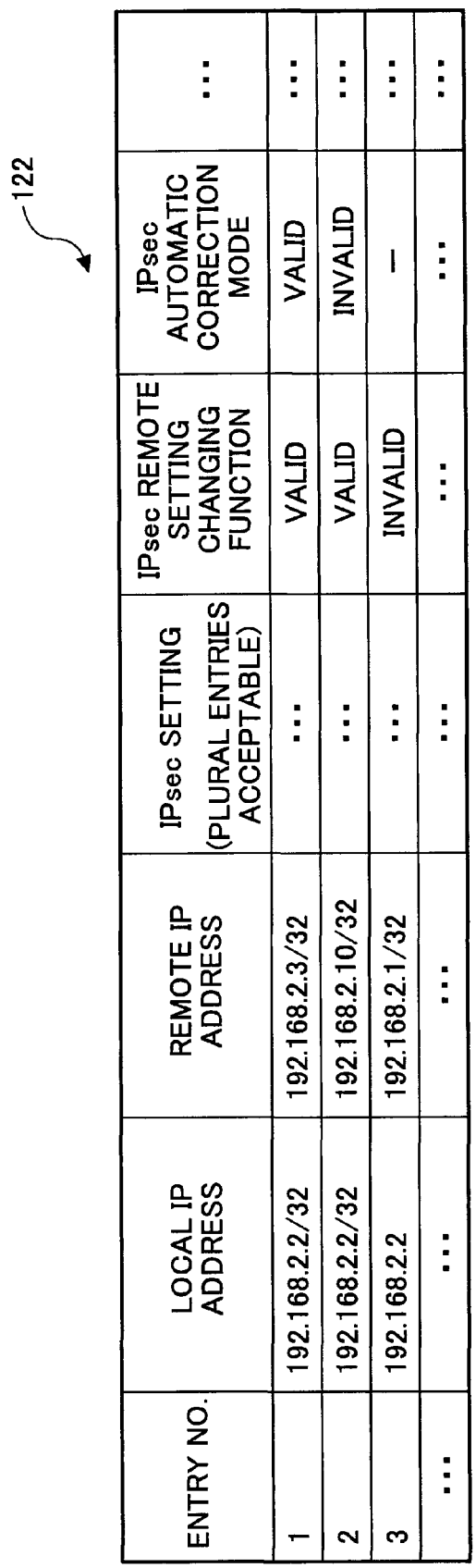
FIG. 3 illustrates an example of a user setting holding table.

FIG. 3 illustrates an example of the user setting holding table 122, for making settings as to whether IPsec is to be applied to each IP address. The fields of the user setting holding table 122 include "entry no." for identifying each IPsec setting entry, "local IP address" which is the IP address of the self-device, "remote IP address" which is the IP address of another device, "IPsec setting" (plural entries acceptable) which is described below, "IPsec remote setting changing function" indicating whether to use (valid) or not to use (invalid) an IPsec remote setting changing function, and "IPsec automatic correction mode" indicating whether to use (valid) or not to use (invalid) an IPsec automatic correction mode. The contents of "IPsec setting" include the following:

IPsec security protocol: AH/ESP/AH+ESP
ISAKMP SA/IPsec SA encryption algorithm
Lifetime, lifetime byte
Encapsulation mode: transport/tunnel mode
IPsec requirement level: require/use
ISAKMP SA hash algorithm: MD5/SHA-1
ISAKMP SA authentication algorithm
ISAKMP SA DH group: 1/2/5/14/15/16/17/18 etc.
IPsec SA duration: lifetime/lifetime byte
PSK character string
Certificate FIG. 4 is a flowchart of a process performed when a prior setting is made by the administrator.

Figure 4:
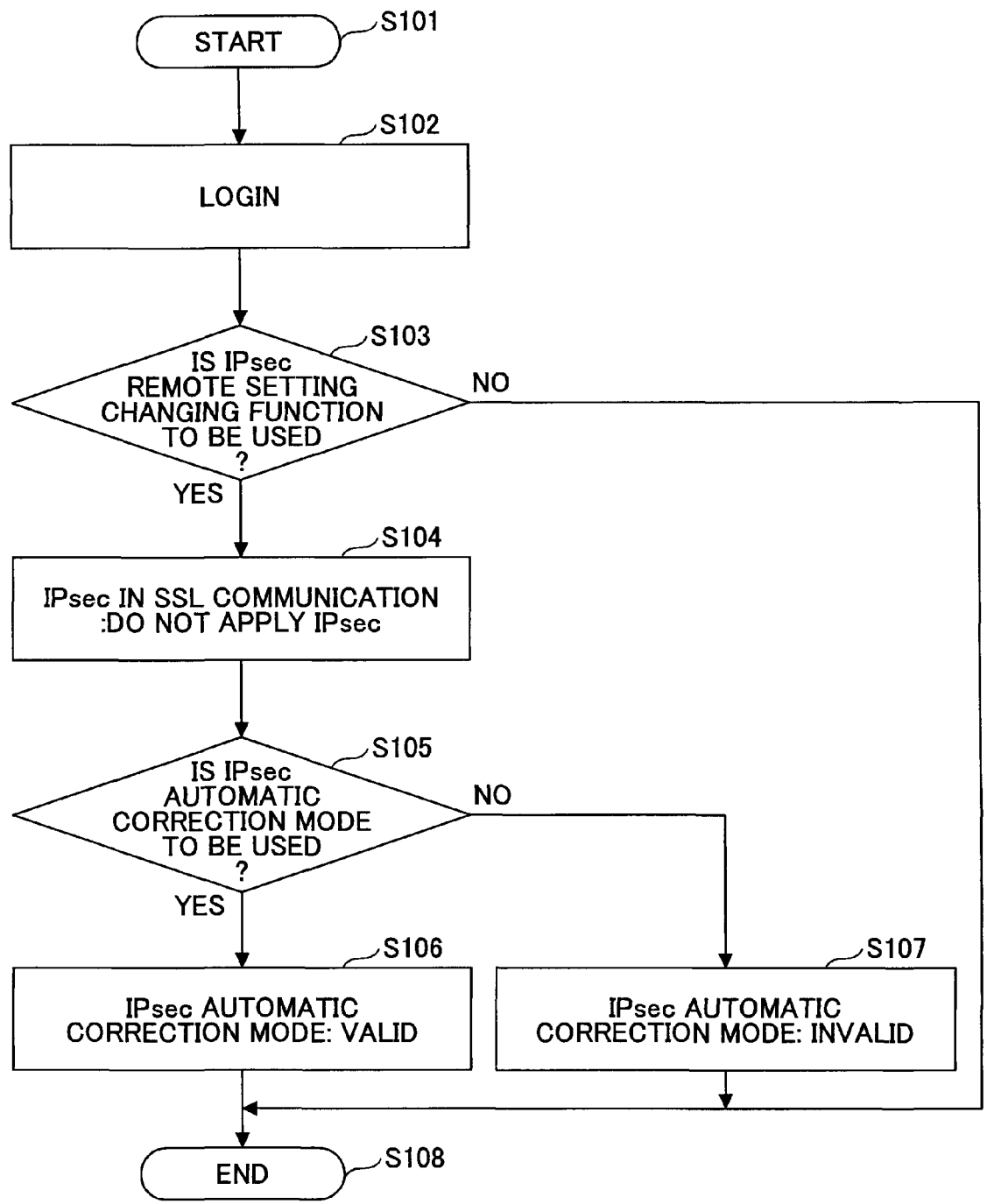
FIG. 4 is a flowchart of a process performed when a prior setting is made by an administrator.

In FIG. 4, when the process starts (step S101), a login process is performed first (step S102) to authenticate whether the user is an administrator. If the user is a remote user, the user will log in from the client side PC. If the user is a local user, the user will log in with an operations panel of the MFP, etc. FIG. 5 illustrates an example of a login page; authentication is performed by having the user input a user name (user ID) and a password. The authentication method is not limited to a particular method; the authentication method is not described herein.

Referring back to FIG. 4, when it is determined that the user is an administrator, a selection made by the administrator is received, which selection indicates whether the IPsec remote setting changing function is to be used (step S103). If the IPsec remote setting changing function is to be used (Yes in step S103), a setting will made such that IPsec is not applied to SSL communication (step S104). In this example, SSL communication is taken as an example of an encrypted communication method; however, the method is not limited to an encrypted communication method.

Conversely, if the IPsec remote setting changing function is not to be used (No in step S103), the process will end (step S108) without making any changes in the setting as to whether IPsec is to be applied to SSL communication.

Next, when IPsec is to be used, a selection made by the administrator is received, which selection indicates whether the IPsec automatic correction mode is to be used (step S105). If the IPsec automatic correction mode is to be used (Yes in step S105), the IPsec automatic correction mode is validated (step S106), and the process ends (step S108). In this mode, as soon as an error occurs due to an incorrect portion in the IPsec settings, the IPsec setting is corrected and a reconnection operation is performed.

Conversely, if the IPsec automatic correction mode is not to be used (No in step S105), the IPsec automatic correction mode is invalidated (step S107), and the process ends (step S108). In this mode, when an error occurs due to an incorrect portion in the IPsec settings, neither is the IPsec setting corrected nor is a reconnection operation performed. Instead, the error portion in the IPsec settings is displayed to the user, the user looks at the contents, and the administrator user can either select an automatic correction mode or make a manual correction.

These settings can be made for each IPsec setting entry. The contents of the settings are held in the user setting holding table 122 (FIG. 3).

FIG. 6 illustrates an example of a setting page for making prior settings. A user can make selections for the IPsec remote setting changing function and the IPsec automatic correction mode with the use of "valid" and "invalid" radio buttons.

Figure 7:
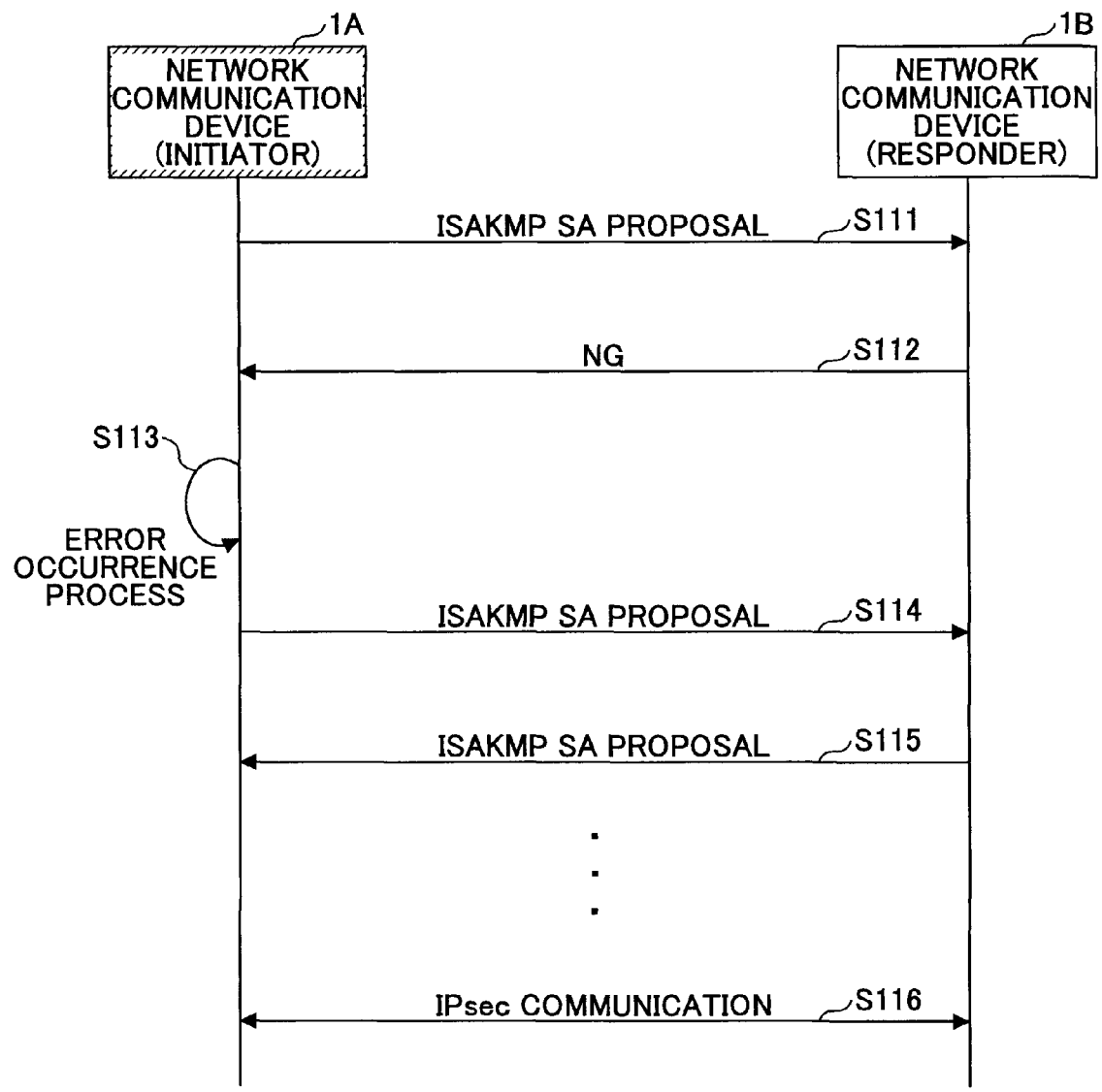
FIG. 7 illustrates a sequence of a process performed when an error occurs at the time of starting IPsec communication and after the error has occurred (part 1)
Figure 8:
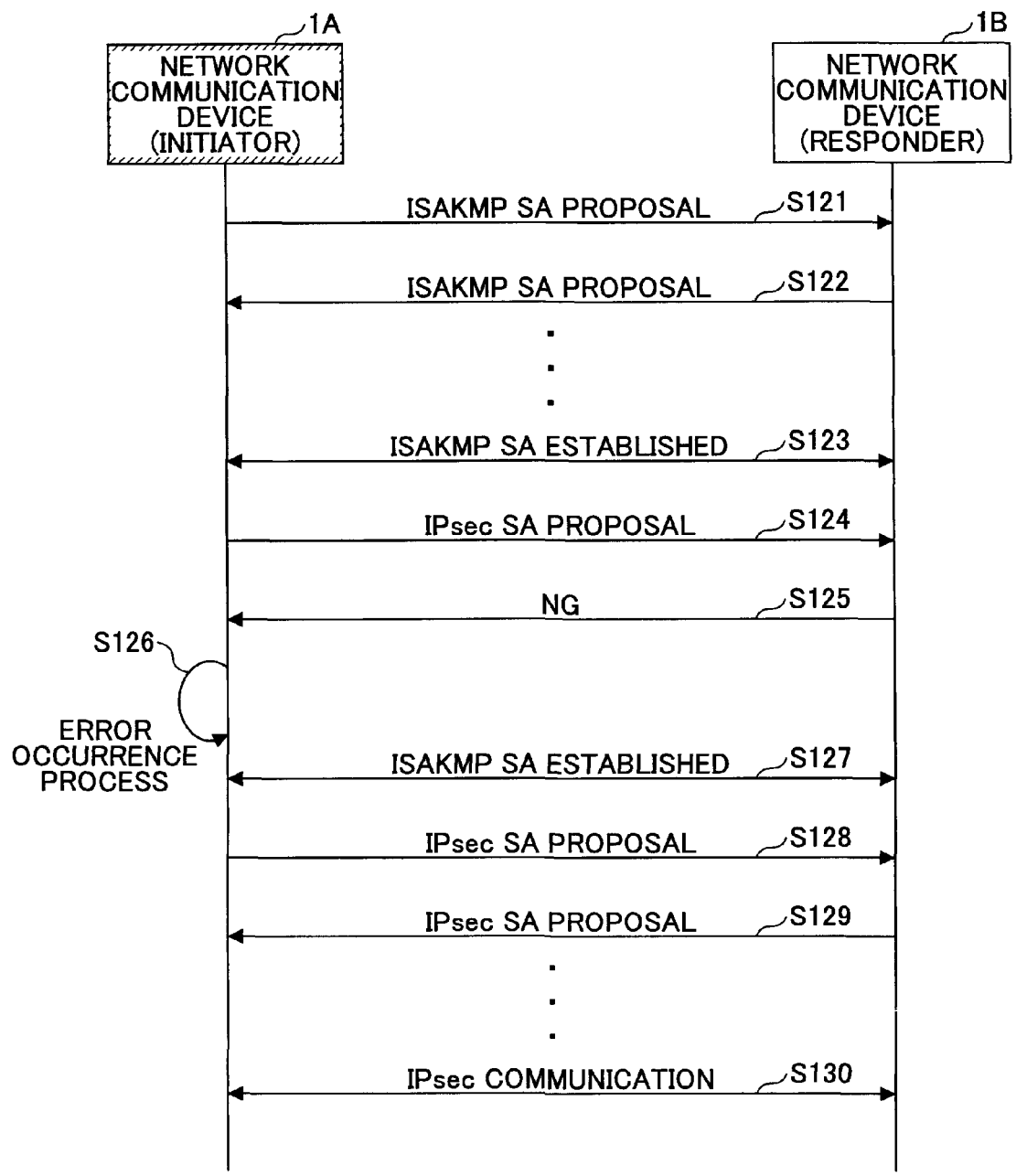
FIG. 8 illustrates a sequence of a process performed when an error occurs at the time of starting IPsec communication and after the error has occurred (part 2)
Figure 9:
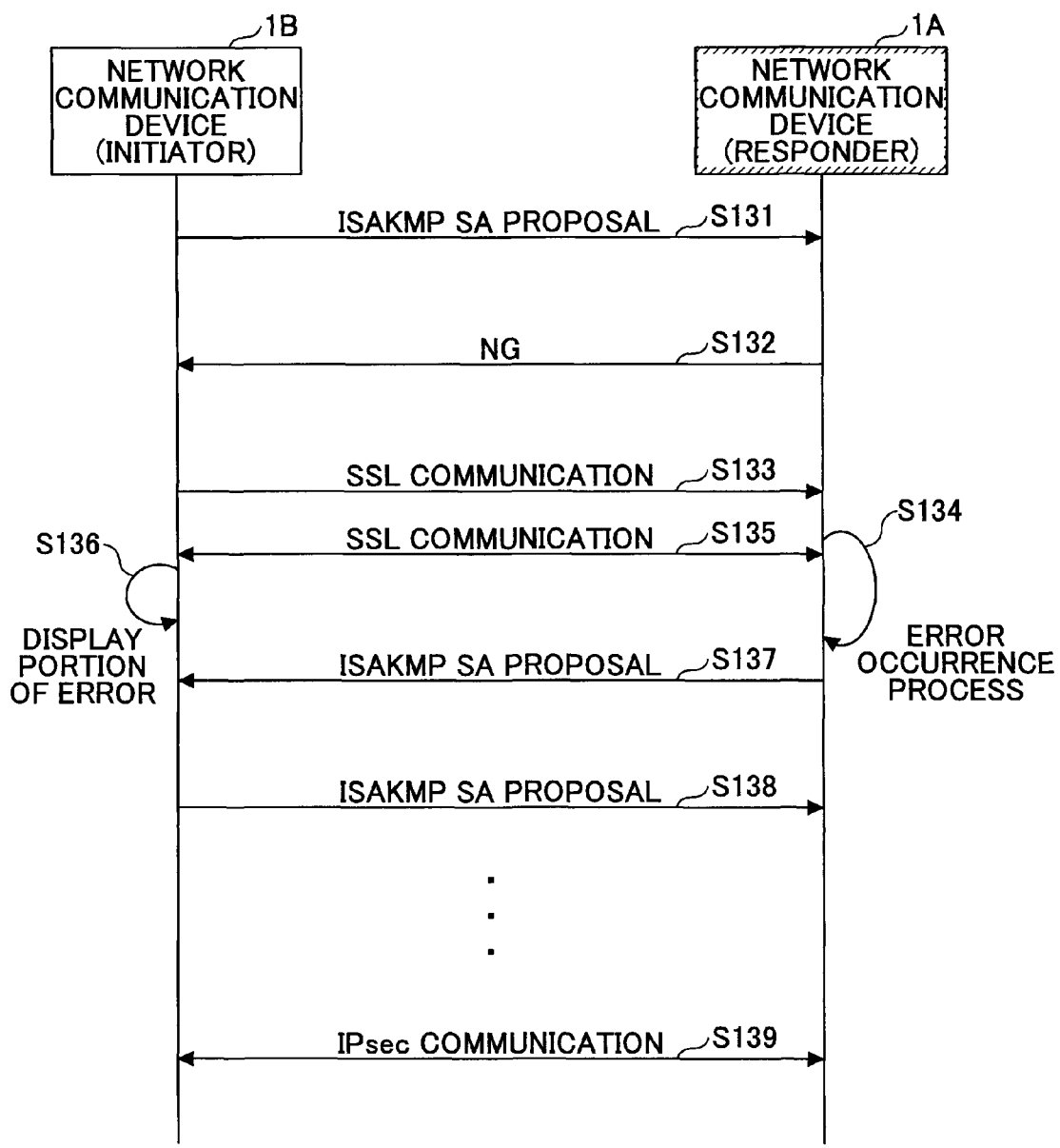
FIG. 9 illustrates a sequence of a process performed when an error occurs at the time of starting IPsec communication and after the error has occurred (part 3)
Figure 10:
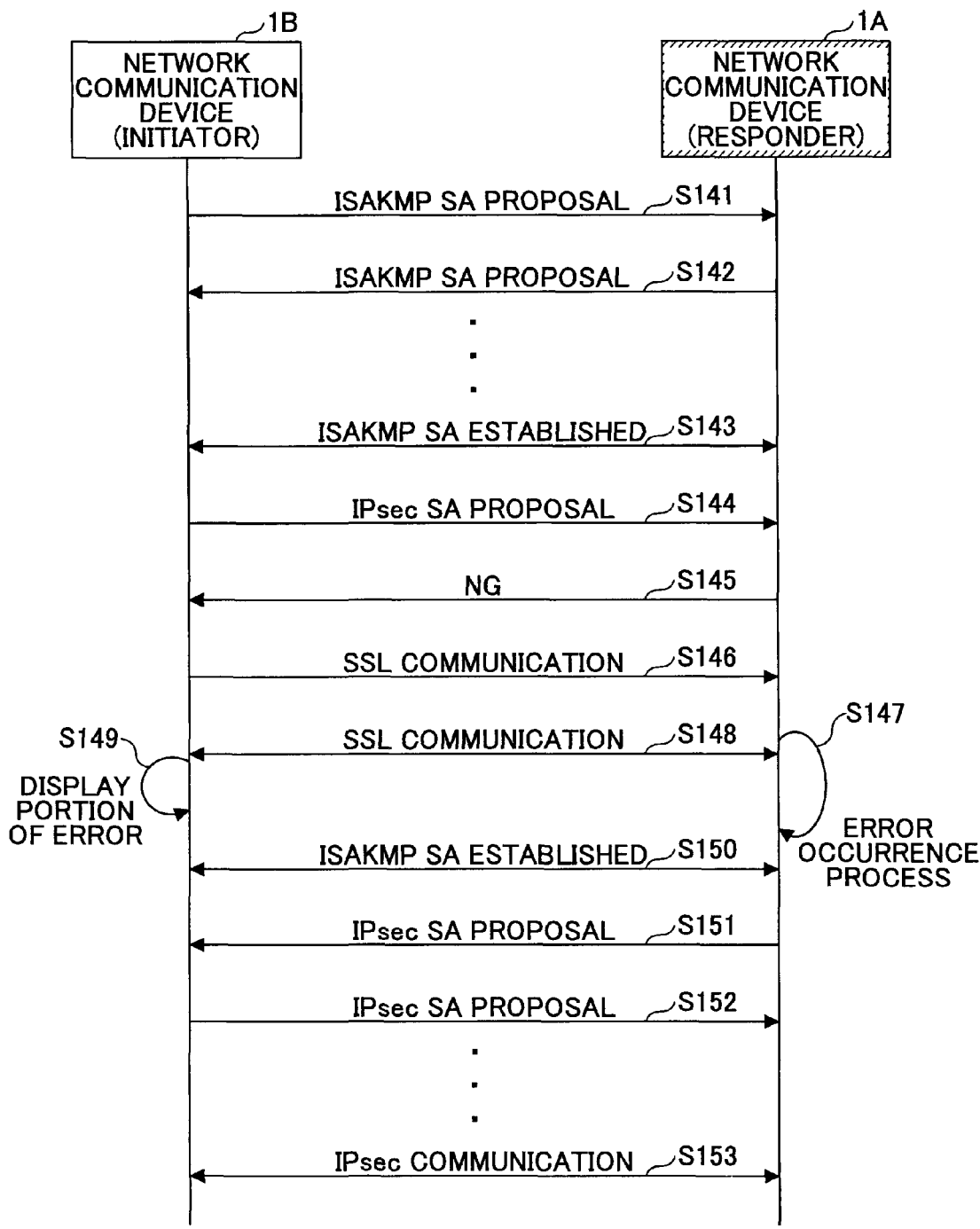
FIG. 10 illustrates a sequence of a process performed when an error occurs at the time of starting IPsec communication and after the error has occurred (part 4)

FIGS. 7 through 10 illustrate a sequence of a process performed when an error occurs at the time of starting IPsec communication and after the error has occurred. FIG. 7 illustrates a case where an error has occurred during negotiations (IKE (Internet Key Exchange) Phase1) performed with ISAKMP SA by the network communication device 1A having functions corresponding to an embodiment of the present invention acting as the initiator side; FIG. 8 illustrates a case where an error has occurred during negotiations (IKE Phase2) performed with IPsec SA by the network communication device 1A having functions corresponding to an embodiment of the present invention acting as the initiator side; FIG. 9 illustrates a case where an error has occurred during negotiations (IKE Phase1) performed with ISAKMP SA by the network communication device 1A having functions corresponding to an embodiment of the present invention acting as the responder side; and FIG. 10 illustrates a case where an error has occurred during negotiations (IKE Phase2) performed with IPsec SA by the network communication device 1A having functions corresponding to an embodiment of the present invention acting as the responder side.

In FIG. 7, the network communication device 1A makes an ISAKMP SA Proposal to the network communication device 1B (step S111). When an error occurs due to an incorrect portion in the IPsec settings and the network communication device 1B returns NG (No Good) to the network communication device 1A (step S112), the network communication device 1A performs an error occurrence process (a process performed when an error has occurred) (the contents of the process are described below) (step S113).

After correcting the IPsec setting, which is done automatically in the automatic correction mode and is done manually in the manual correction mode, the network communication device 1A once again makes an ISAKMP SA Proposal to the network communication device 1B (step S114). The network communication device 1B also makes an ISAKMP SA Proposal to the network communication device 1A (step S115). Finally, IPsec communications are enabled between the network communication device 1A and the network communication device 1B (step S116).

In FIG. 8, the network communication device 1A makes an ISAKMP SA Proposal to the network communication device 1B (step S121). The network communication device 1B also makes an ISAKMP SA Proposal to the network communication device 1A (step S122). IPsec communications are established between the network communication device 1A and the network communication device 1B (step S123).

Next, the network communication device 1A makes an IPsec SA Proposal to the network communication device 1B (step S124). When an error occurs due to an incorrect portion in the IPsec settings and the network communication device 1B returns NG (No Good) to the network communication device 1A (step S125), the network communication device 1A performs an error occurrence process (the contents of the process are described below) (step S126).

After correcting the IPsec setting, which is done automatically in the automatic correction mode and is done manually in the manual correction mode, and when the ISAKMP SA is established (step S127), the network communication device 1A makes an IPsec SA Proposal to the network communication device 1B (step S128), and the network communication device 1B also makes an IPsec SA Proposal to the network communication device 1A (step S129). Finally, IPsec communications are enabled between the network communication device 1A and the network communication device 1B (step S130).

In FIG. 9, the network communication device 1B makes an ISAKMP SA Proposal to the network communication device 1A (step S131). When an error occurs due to an incorrect portion in the IPsec settings, the network communication device 1A returns NG (No Good) to the network communication device 1B (step S132).

Subsequently, when the network communication device 1B logs into the network communication device 1A by SSL communication (step S133), the network communication device 1A performs an error occurrence process (the contents of the process are described below) (step S134). Data are transmitted/received between the network communication devices 1A and 1B (step S135). The portion of the error is displayed on the network communication device 1B (step S136).

In the automatic correction mode, the network communication device 1A automatically corrects the IPsec setting, and this time, the network communication device 1A makes an ISAKMP SA Proposal to the network communication device 1B (step S137). The network communication device 1B also makes an ISAKMP SA Proposal to the network communication device 1A (step S138). Finally, IPsec communications are enabled between the network communication device 1A and the network communication device 1B (step S139).

In the manual correction mode, the IPsec setting is manually corrected from the network communication device 1B, and the network communication device 1B once again initiates a negotiation with the network communication device 1A.

In FIG. 10, the network communication device 1B makes an ISAKMP SA Proposal to the network communication device 1A (step S141). The network communication device 1A also makes an ISAKMP SA Proposal to the network communication device 1B (step S142). ISAKMP SA is established between the network communication device 1A and the network communication device 1B (step S143).

Next, the network communication device 1B makes an IPsec SA Proposal to the network communication device 1A (step S144). When an error occurs due to an incorrect portion in the IPsec settings, the network communication device 1A returns NG to the network communication device 1B (step S145).

Subsequently, when the network communication device 1B logs into the network communication device 1A by SSL communication (step S146), the network communication device 1A performs an error occurrence process (the contents of the process are described below) (step S147). Data are transmitted/received between the network communication devices 1A and 1B (step S148). The portion of the error is displayed on the network communication device 1B (step S149).

After correcting the IPsec setting, which is done automatically in the automatic correction mode, and when the ISAKMP SA is established (step S150), this time, the network communication device 1A makes an IPsec SA Proposal to the network communication device 1B (step S151), and the network communication device 1B also makes an IPsec SA Proposal to the network communication device 1A (step S152). Finally, IPsec communications are enabled between the network communication device 1A and the network communication device 1B (step S153).

In the manual correction mode, the IPsec setting is manually corrected from the network communication device 1B, and the network communication device 1B once again initiates a negotiation with the network communication device 1A.

Figure 11:
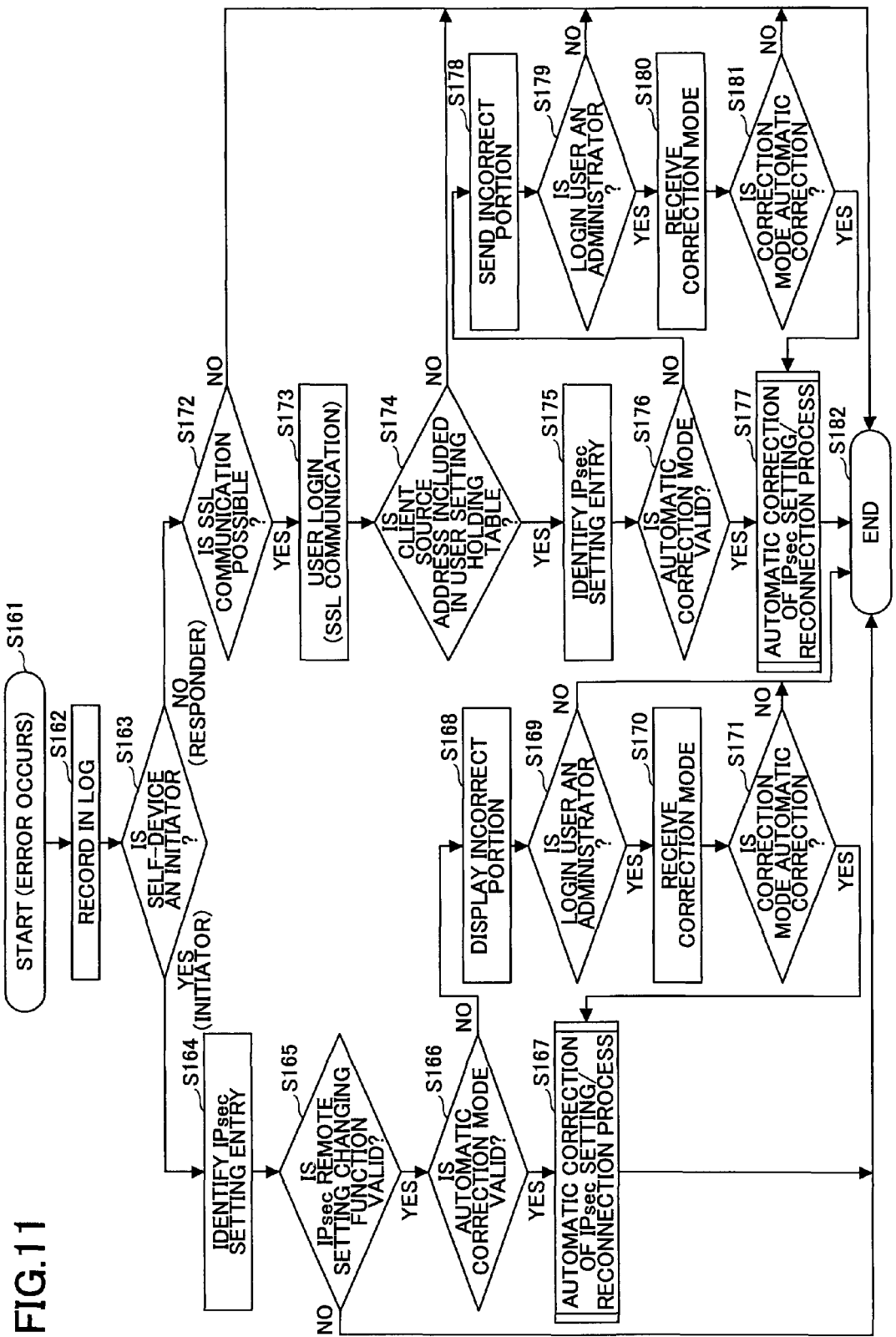
FIG. 11 is a flowchart of a process performed when an error has occurred.

FIG. 11 is a flowchart of the error occurrence process performed in steps S113, S126, S134, and S147 in FIGS. 7 through 10.

In FIG. 11, when the process is started as an error occurs (step S161), the encrypted communication control unit 123 records the error in a log (step S162). The information recorded in this log will be later used for identifying the portion of the mistake (incorrect portion) in the IPsec settings.

Next, the initiator/responder determining unit 125a determines whether the self-device is the initiator (step S163).

When the self-device is the initiator (Yes in step S163), the IPsec setting entry identifying unit 125d identifies a corresponding IPsec setting entry in the user setting holding table 122 (FIG. 3) based on an IP address of the self-device and an IP address of the other device (step S164). The user setting determining unit 125e determines whether the IPsec remote setting changing function is valid (step S165). When the IPsec remote setting changing function is invalid (No in step S165), the process ends (step S182).

When the IPsec remote setting changing function is valid (Yes in step S165), the user setting determining unit 125e determines whether the automatic correction mode is valid (step S166). When the user setting determining unit 125e determines that the automatic correction mode is valid (Yes in step S166), the IPsec setting automatic correction unit 125i and the IPsec reconnection control unit 125j perform an automatic correction of the IPsec setting/a reconnection process (the contents of the process are described below) (step S167), and the process ends (step S182).

When the automatic correction mode is invalid (No in step S166), the error portion display unit 125h identifies the incorrect portion based on the log in which the error occurrence has been recorded, and displays the incorrect portion on the operations panel of the self-device (step S168). FIG. 12 illustrates an example of a page displaying the incorrect portions. Among the various items of the IPsec settings, the incorrect portions are emphasized, as denoted by "P". This example indicates that the IKE encryption algorithm and the DH group are erroneous.

Next, referring back to FIG. 11, the user determining unit 125f determines whether the user who has logged into the self-device is an administrator (step S169). When the user is not an administrator (No in step S169) the process ends (step S182).

When the user who has logged in is an administrator (Yes in step S169), the correction mode receiving unit 125g receives a selection of a correction mode (automatic correction/manual correction) from the user (step S170), and determines whether the automatic correction mode has been selected (step S171).

When the automatic correction mode has been selected (Yes in step S171), the IPsec setting automatic correction unit 125*i* and the IPsec reconnection control unit 125*j* perform an automatic correction of the IPsec setting/a reconnection process (step S167). When the manual correction mode has been selected (No in step S171) the process ends (step S182). When the automatic correction mode has been selected (Yes in step S171), the IPsec automatic correction mode of the corresponding entry in the user setting holding table 122 can be validated.

When the self-device is the responder (No in step S163), the SSL communication determining unit 125*b* determines whether SSL communication is possible (step S172). When SSL communication is not possible (No in step S172) the process ends (step S182).

When SSL communication is possible (Yes in step S172), the self-device receives a login from the other device by SSL communications with the basic functions of SSL (step S173). The client user address acquiring unit 125*c* acquires a client source address from the transmission source IP address and the IPsec setting entry identifying unit 125*d* determines whether the client source address is included in the user setting holding table 122 (step S174). When it is not included (No in step S174) the process ends (step S182).

When the client source address is included in the user setting holding table 122 (Yes in step S174), the IPsec setting entry identifying unit 125*d* identifies a corresponding IPsec setting entry in the user setting holding table 122 (FIG. 3) (step S175). The user setting determining unit 125*e* determines whether the automatic correction mode is valid (step S176).

When the automatic correction mode is valid (Yes in step S176), the IPsec setting automatic correction unit 125*i* and the IPsec reconnection control unit 125*j* perform an automatic correction of the IPsec setting/a reconnection process (the contents of the process are described below) (step S177), and the process ends (step S182).

When the IPsec remote setting changing function is invalid (No in step S176), the error portion display unit 125*h* identifies the incorrect portion based on the log in which the error occurrence has been recorded, and displays the incorrect portion by sending data of the incorrect portion to the other device (FIG. 12) (step S178).

Next, the user determining unit 125*f* determines whether the user who has logged in from the other device is an administrator (step S179). When the user is not an administrator (No in step S179) the process ends (step S182).

When the user who has logged in is an administrator (Yes in step S179), the correction mode receiving unit 125*g* receives a selection of a correction mode (automatic correction/manual correction) from the user (step S180), and determines whether the automatic correction mode has been selected (step S181).

When the automatic correction mode has been selected (Yes in step S181), the IPsec setting automatic correction unit 125*i* and the IPsec reconnection control unit 125*j* perform an automatic correction of the IPsec setting/a reconnection process (step S177). When the manual correction mode has been selected (No in step S181) the process ends (step S182).

Figure 13:
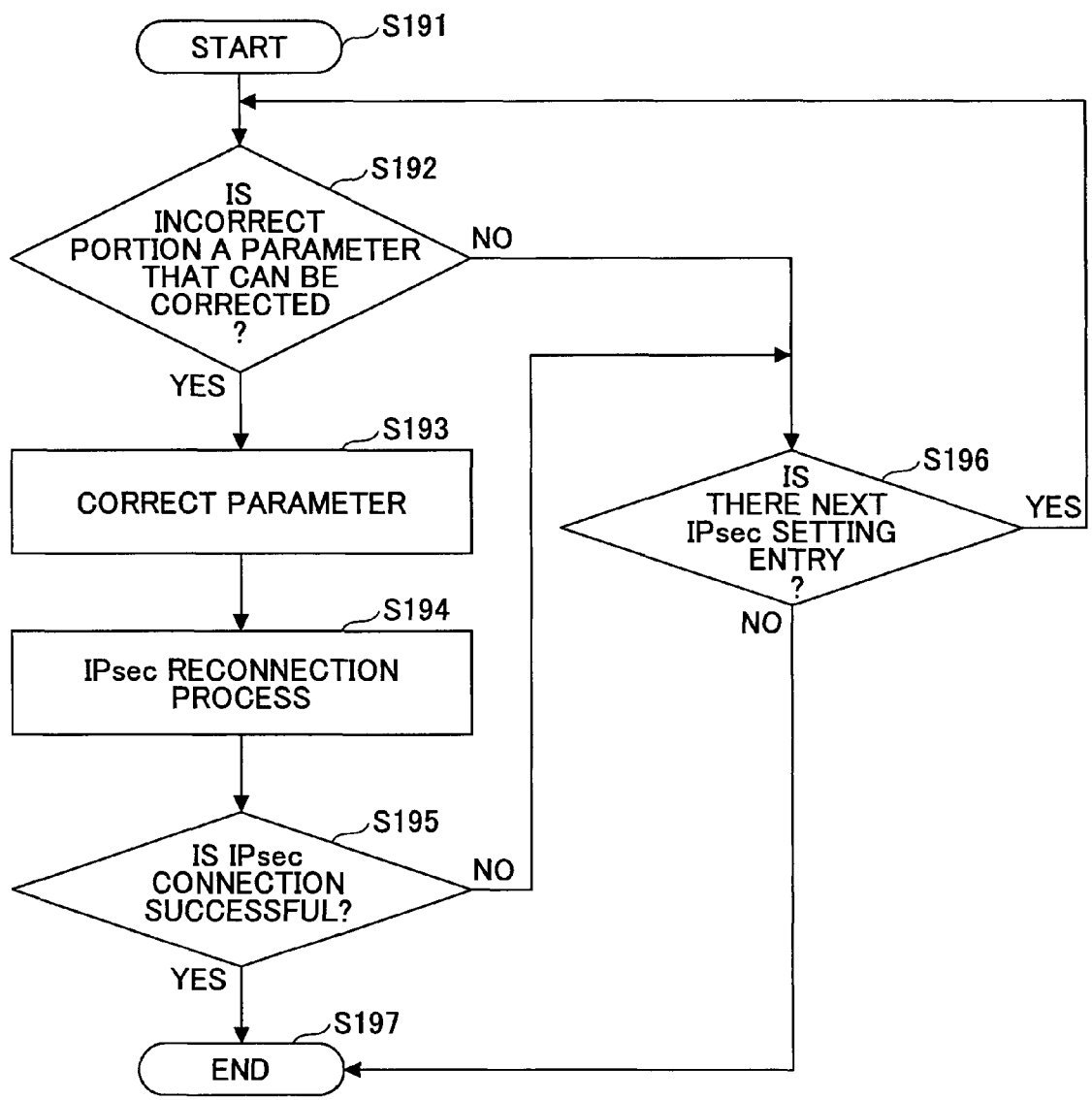
FIG. 13 is a flowchart of an automatic correction of IPsec setting/reconnection process.

FIG. 13 is a flowchart of the automatic correction of the IPsec setting/the reconnection process performed in steps S167 and S177 in FIG. 11.

In FIG. 13, when the process is started (step S191), it is determined whether the incorrect portion is a parameter that can be corrected (step S192). Parameters that can be corrected include the following:
  IPsec security protocol: AH/ESP/AH+ESP
  ISAKMP SA/IPsec SA encryption algorithm
  Lifetime, lifetime byte
  Encapsulation mode: transport/tunnel mode
  IPsec requirement level: require/use
  ISAKMP SA hash algorithm: MD5/SHA-1
  ISAKMP SA authentication algorithm
  ISAKMP SA DH group: 1/2/5/14/15/16/17/18 etc.
  IPsec SA duration: lifetime/lifetime byte
Parameters that cannot be corrected include the following:
  PSK character string
  Certificate When the parameter can be corrected (Yes in step S192), the parameter is corrected (step S193), and an IPsec reconnection process is performed (step S194). The correction is not made by overwriting an IPsec setting entry that already exists; the correction is made by adding a new entry.

Next, it is determined as to whether IPsec connection is successfully accomplished (Yes in step S195), and when it is successfully accomplished (Yes in step S195), the process ends (step S197).

When the parameter cannot be corrected (No in step S192), or when IPsec connection is not successfully accomplished (No in step S195), the IPsec setting entry identifying unit 125*d* determines whether there is an IPsec setting entry in the user setting holding table 122 having the next highest priority (step S196). When affirmative (Yes in step S196), the same process is repeated starting from determining whether the parameter can be corrected (step S192). When there is no IPsec setting entry having the next highest priority (No in step S196), the process ends (step S197).

According to the first embodiment of the present invention, the following effects are attained:

(1) Even if the user has made a mistake (has set an incorrect portion) in the IPsec settings, the device will automatically change the corresponding parameter so that an IPsec reconnection process can be performed.

(2) Even if the user has made a mistake (has set an incorrect portion) in the IPsec settings, it will be possible to identify the incorrect portion in the IPsec settings.

(3) By having the contents concerning the incorrect portion in the IPsec settings recorded in a log, the administrator can make an ex post facto confirmation of information on the incorrect portion.

(4) A selection can be made whether the IPsec settings are to be made automatically or manually, according to the contents of the incorrect portion in the IPsec settings.

(5) Only the administrator is allowed to manually change the contents of the IPsec settings, and it is therefore possible to prevent a user, who is not authorized to be an administrator, from arbitrarily invalidating an IPsec setting by manually changing the contents.

(6) A user other than the administrator can confirm where the mistake has been made (where the incorrect portion is) in the IPsec setting, and therefore the user can correct an inconsistent parameter in the device used by the user.

(7) By correcting an item with high priority, even if the IPsec setting has been changed, it will be possible to perform IPsec communication as desired by the user.

(8) The corrected IPsec setting is added as another new IPsec setting item, and will thus not affect other IPsec entries.

(9) Even if the item with the highest priority among the IPsec setting items cannot be corrected, it will be possible to correct the IPsec setting item with the next highest priority, thereby increasing the possibility of IPsec connection.

(10) If an IP address with which the device is connected does not correspond to any of the IPsec entries, an unnecessary reconnection process will be immediately aborted, thus preventing unnecessary packets from flowing and increasing the network traffic.

Second Embodiment

In a second embodiment of the present invention, if an error occurs due to an incorrect portion in the IPsec settings, it will be possible to safely cancel IPsec from a remote location. If a device is simply provided with a mechanism for cancelling IPsec communication from a remote location, the following problems may arise:

- A security hole may be formed.
- An IPsec cancel address may be leaked to a third party even when IPsec is canceled by encrypted communication other than IPsec such as SSL, and consequently, the third party may commit unauthorized access.

However, in the second embodiment, safety is enhanced by dynamically generating an IPsec cancel address that cannot be reused. This configuration is not dependent on the version of the IP address.

Furthermore, the second embodiment can be implemented in combination with the first embodiment.

Figure 14:
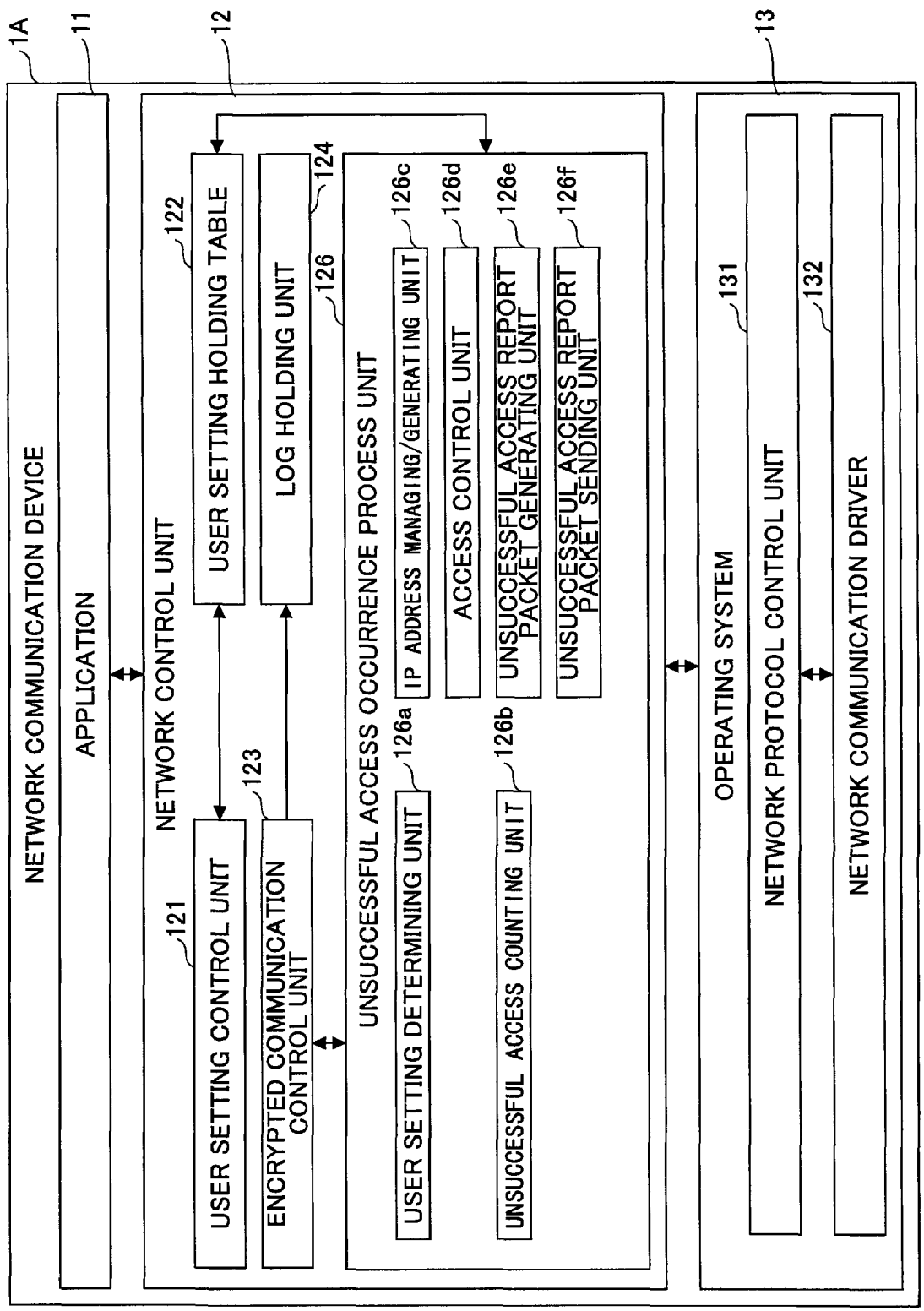
FIG. 14 is a block diagram of a network communication device according to a second embodiment of the present invention.

FIG. 14 is a block diagram of the network communication device 1A according to the second embodiment of the present invention.

In FIG. 14, an unsuccessful access occurrence process unit 126 is provided in the network control unit 12; otherwise, the configuration is the same as that shown in FIG. 2. Furthermore, it is assumed that the network configuration is the same as that shown in FIG. 1.

In FIG. 14, the unsuccessful access occurrence process unit 126 performs a predetermined process when access to the self-device has been unsuccessfully due to an incorrect portion (error) in the IPsec settings. The unsuccessful access occurrence process unit 126 includes a user setting determining unit 126a for determining a user setting concerning unsuccessful access and an unsuccessful access counting unit 126b for counting the unsuccessful accesses.

Furthermore, the unsuccessful access occurrence process unit 126 includes an IP address managing/generating unit 126c for managing IP addresses and dynamically generating an IP address for sending unsuccessful access report packets, an access control unit 126d for making a setting in the operating system 13 such that an address that has once been used for access (transmission source IP address, IPsec cancel address) cannot be used again, an unsuccessful access report packet generating unit 126e for generating unsuccessful access report packets, and an unsuccessful access report packet sending unit 126f for sending a generated unsuccessful access report packet.

FIG. 15 illustrates the user setting holding table 122 (a part that corresponds to the IPsec unsuccessful access report function). The fields in this part include "IPsec unsuccessful access report function" indicating whether to use (valid) or not to use (invalid) the IPsec unsuccessful access report function, "IP address/host name of administrator" indicating where to send an unsuccessful access report packet, "maximum number of unsuccessful accesses" indicating the threshold of the number of unsuccessful accesses to act as a trigger for sending an unsuccessful access report packet, "number of unsuccessful accesses" indicating the present number of unsuccessful accesses, and "IPsec cancel address function" indicating whether to use (valid) or not to use (invalid) the IPsec cancel address function. In the example shown in FIG. 15, the settings are made uniformly regardless of the IPsec setting entry; however, these settings can be made for each IPsec setting entry.

Figure 16:
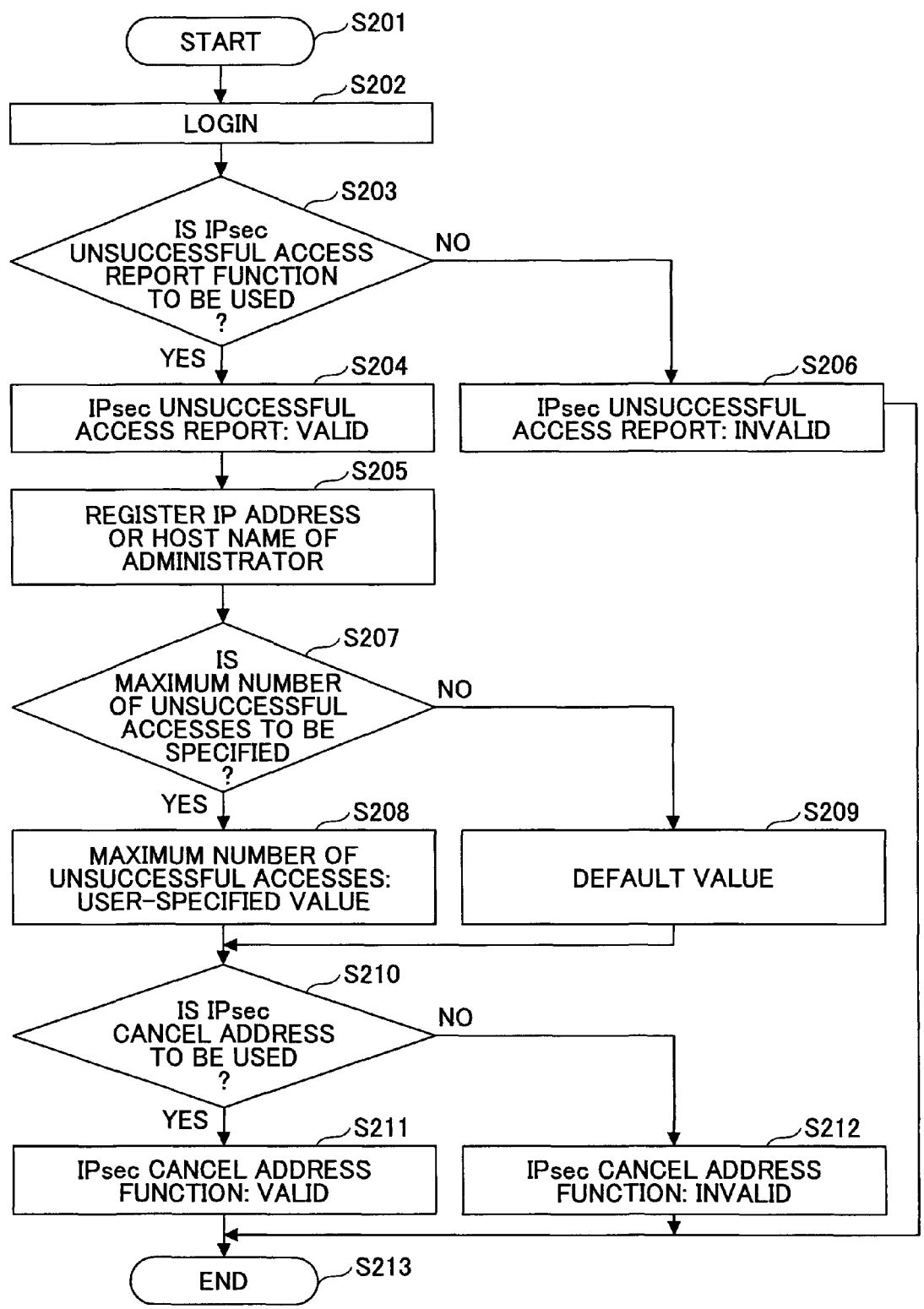
FIG. 16 is a flowchart of a process performed when a prior setting is made by the administrator.

FIG. 16 is a flowchart of a process performed when a prior setting is made by the administrator.

In FIG. 16, when the process starts (step S201), a login process is performed first (step S202) to authenticate whether the user is an administrator. If the user is a remote user, the user will log in from the client side PC. If the user is a local user, the user will log in with an operations panel of the MFP, etc. The login page is the same as that shown in FIG. 5.

Next, in FIG. 16, when it is determined that the user is an administrator, a selection made by the administrator is received, which selection indicates whether the IPsec unsuccessful access report function is to be used (step S203). If the IPsec unsuccessful access report function is to be used (Yes in step S203), the IPsec unsuccessful access report function will be validated (step S204), and the IP address or the host name of the administrator is input and registered (step S205).

Conversely, if the IPsec unsuccessful access report function is not to be used (No in step S203), the IPsec unsuccessful access report function will be invalidated (step S206), and the process will end (step S213).

Next, when the IPsec unsuccessful access report function is to be used, a selection made by the administrator is received. This selection indicates whether to specify the maximum number of unsuccessful accesses, which is a condition for receiving unsuccessful access reports (step S207). When the maximum number of unsuccessful accesses is to be specified (Yes in step S207), the maximum number of accesses is input by the administrator and is then set (step S208). When the maximum number of unsuccessful accesses is not to be specified (No in step S207), a default value is set as the maximum number of unsuccessful accesses (step S209). Accordingly, when the number of unsuccessful accesses exceeds the maximum number of unsuccessful accesses, the device sends an unsuccessful access report packet to the IP address or the host name of the administrator.

Next, a selection made by the administrator is received, which selection indicates whether the IPsec cancel address function is to be used (step S210). If the IPsec cancel address function is to be used (Yes in step S210), the IPsec cancel address function will be validated (step S211). If the IPsec cancel address function is not to be used (No in step S210), the IPsec cancel address function will be invalidated (step S212), and the process will end (step S213). If the IPsec cancel address function is to be used, an IPsec cancel address will be written inside the unsuccessful access report packet. If the IPsec cancel address function is not to be used, an IPsec cancel address will not be written inside the unsuccessful access report packet.

These setting contents are held in the user setting holding table 122 (FIG. 15).

Figure 17:
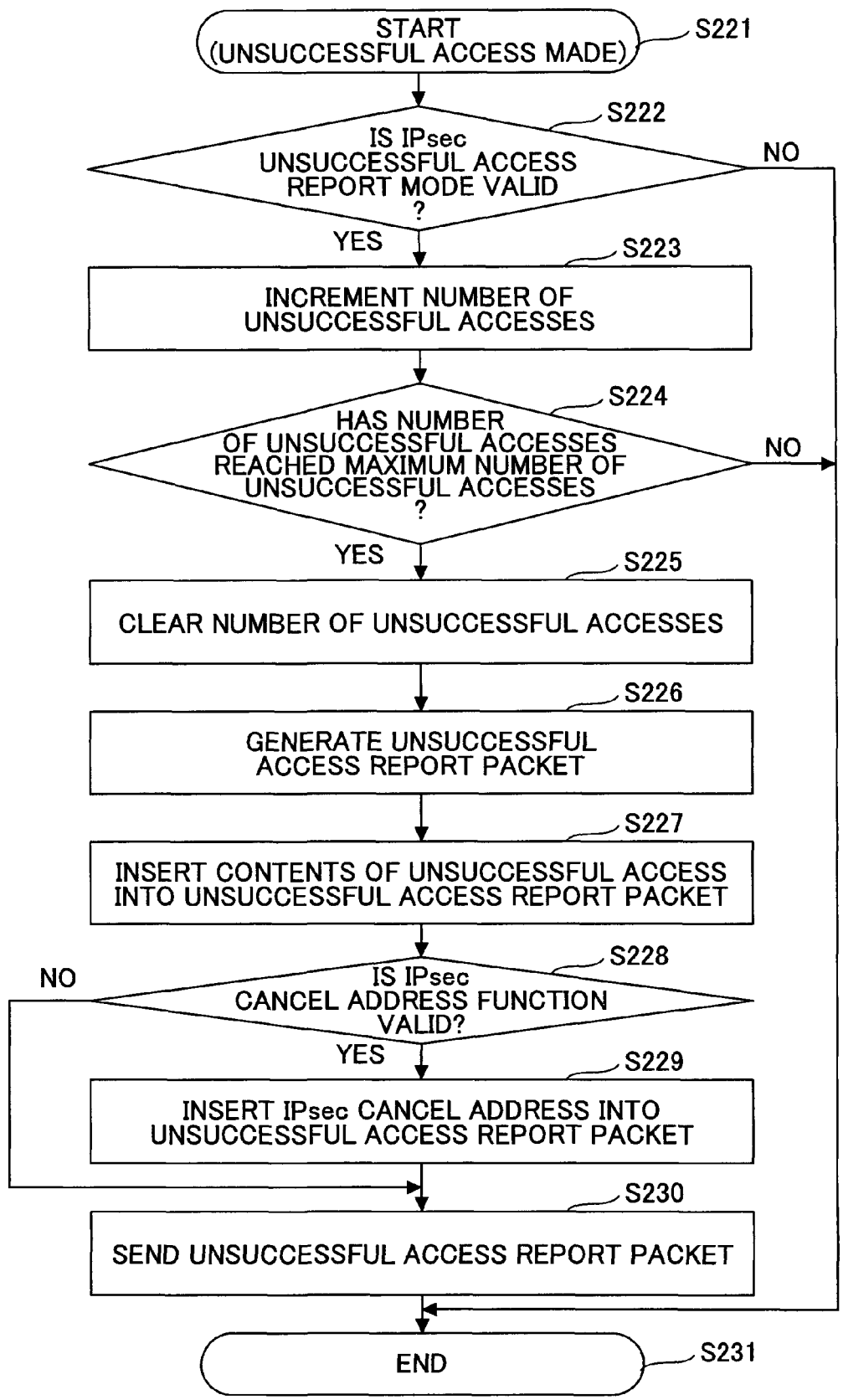
FIG. 17 is a flowchart of a process performed when an unsuccessful access has occurred.

FIG. 17 is a flowchart of a process performed when an unsuccessful access has occurred.

In FIG. 17, when the process is started as an unsuccessful access is made to the self-device (step S221), the user setting determining unit 126a determines whether the IPsec unsuccessful access report mode is valid by referring to the user setting holding table 122 (FIG. 15) (step S222). When the IPsec unsuccessful access report mode is invalid (No in step S222), the process ends (step S231).

When the IPsec unsuccessful access report mode is valid (Yes in step S222), the unsuccessful access counting unit 126b increments the number of unsuccessful accesses in the user setting holding table 122 by one (step S223), and determines whether the number of unsuccessful accesses has reached the maximum number of unsuccessful accesses (step S224). When the number of unsuccessful accesses has not reached the maximum number of unsuccessful accesses (No in step S224) the process ends (step S231).

When the number of unsuccessful accesses has reached the maximum number of unsuccessful accesses (Yes in step S224), the unsuccessful access counting unit 126b clears the number of unsuccessful accesses in the user setting holding table 122 (step S225) and the unsuccessful access report packet generating unit 126e generates an unsuccessful access report packet (step S226). At this time, the IP address managing/generating unit 126c dynamically generates, as a temporary address, a transmission source IP address used when sending the unsuccessful access report packet.

Next, the unsuccessful access report packet generating unit 126e inserts the contents of the unsuccessful access into the unsuccessful access report packet (step S227).

Next, the user setting determining unit 126a determines whether the IPsec cancel address function is valid based on the user setting holding table 122 (FIG. 15) (step S228). When the IPsec cancel address function is valid (Yes in step S228), the IP address managing/generating unit 126c generates an IPsec cancel address, and the unsuccessful access report packet generating unit 126e inserts the IPsec cancel address into the unsuccessful access report packet (step S229). When the IPsec cancel address function is invalid (No in step S228), an IPsec cancel address is neither generated nor inserted into the unsuccessful access report packet.

Next, the unsuccessful access report packet sending unit 126f sends an unsuccessful access report packet to a registered user address (step S230), and the process ends (step S231).

Figure 18:
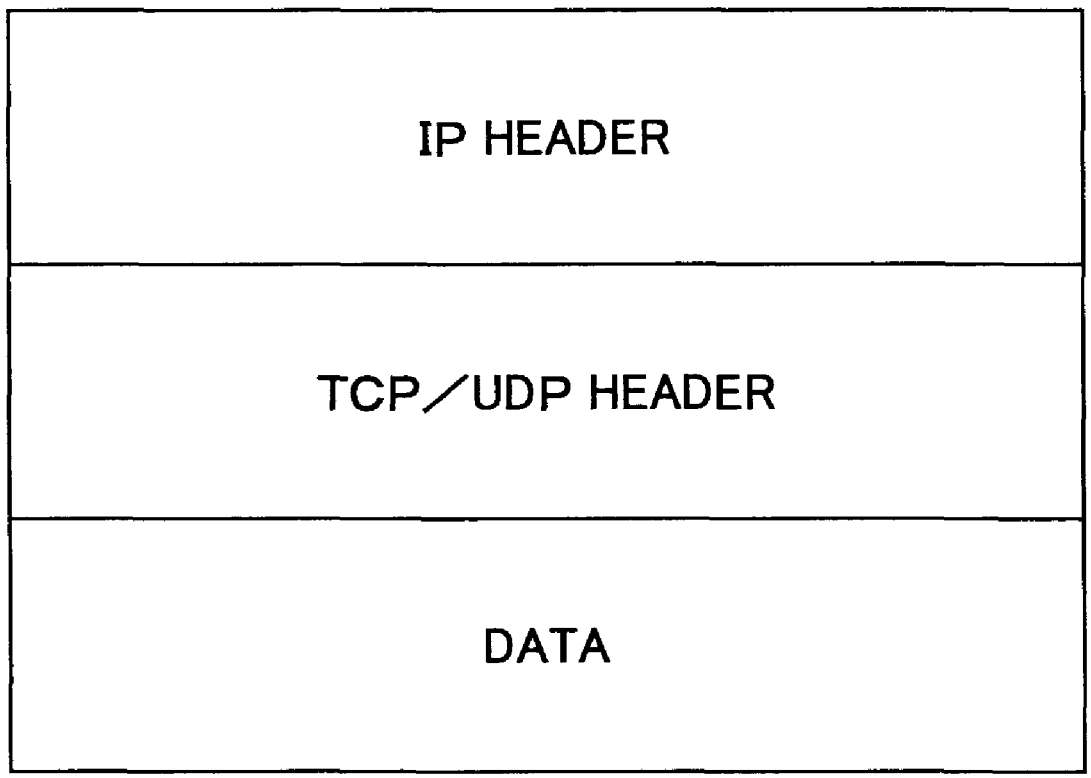
FIG. 18 illustrates a structure of an unsuccessful access report packet.

FIG. 18 illustrates a structure of the unsuccessful access report packet. This packet is based on TCP (Transmission Control Protocol) or UDP (User Datagram Protocol), and includes an IP header, a TCP/UDP header, and data (HELP data). The data include a host name (IP address), the error contents, and an IPsec cancel address (only when the IPsec cancel address function is valid).

Figure 19:
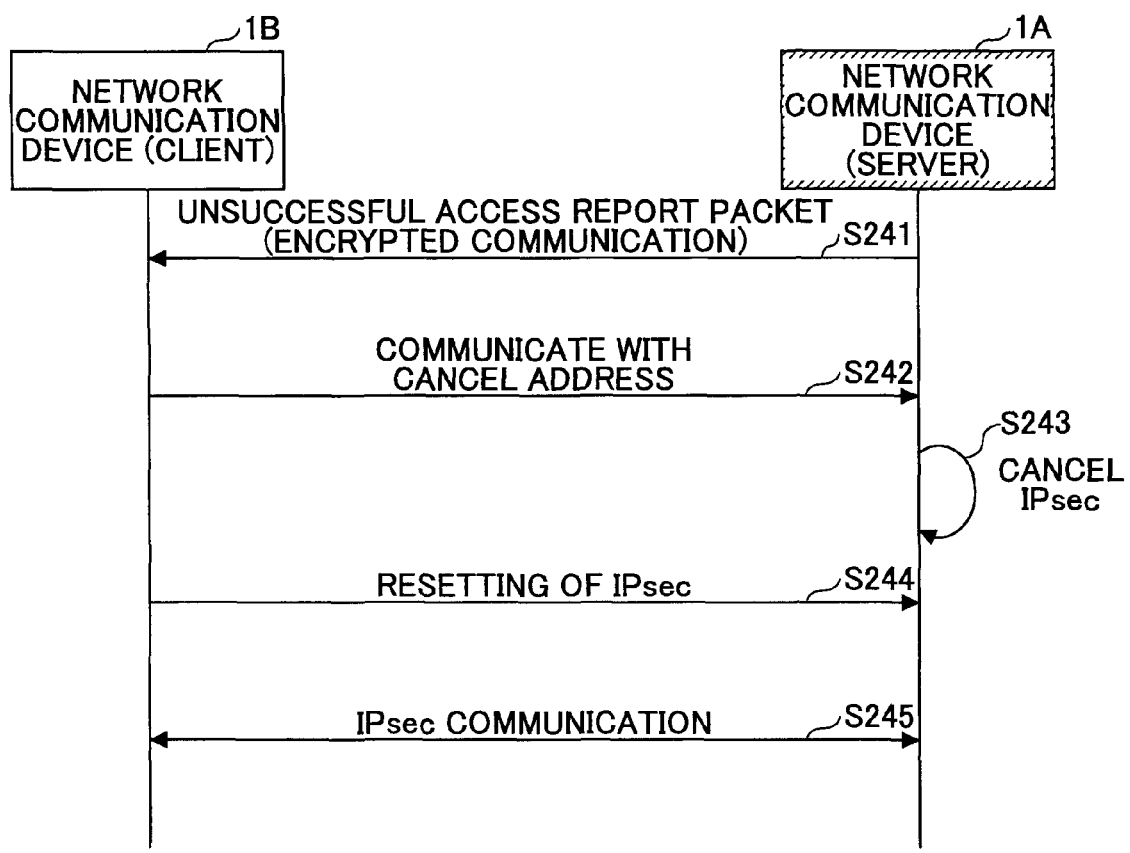
FIG. 19 is a sequence of a process performed after making an unsuccessful access report.

FIG. 19 is a sequence of a process performed after sending the unsuccessful access report packet.

In FIG. 19, the network communication device 1A, which has functions corresponding to an embodiment of the present invention, sends an unsuccessful access report packet to the network communication device 1B by encrypted communication such as SSL (step S241). The network communication device 1B can thus know the status of the unsuccessful access, and when the IPsec cancel address function is valid, the network communication device 1B can acquire the IPsec cancel address. FIG. 20 illustrates a page displayed on the side that has received the unsuccessful access report. Upon confirming the "host name", the "IP address", and the "IPsec status", the user can press the "IPsec cancel" button to communicate with the IPsec cancel address and cancel the IPsec communication.

Referring back to FIG. 19, when the network communication device 1B communicates with the IPsec cancel address included in the unsuccessful access report packet (step S242), the network communication device 1A performs IPsec cancellation (step S243).

Subsequently, the network communication device 1B makes an appropriate resetting of IPsec for the network communication device 1A (step S244), and IPsec communications are enabled between the network communication device 1A and the network communication device 1B (step S245).

According to the second embodiment of the present invention, the following effects are attained:
(1) When there is a mistake (an incorrect portion) in the IPsec settings, the IPsec settings can be safely canceled even from a remote location.
(2) Even if an IPsec cancel IP address is leaked to a third party, it will be possible to prevent unauthorized access with the IPsec cancel IP address, because the IPsec cancel IP address can only be used once.
(3) When the device is managing IPsec unsuccessful accesses, and the number of times that an unsuccessful access is made exceeds a certain number, a message is sent to the network administrator to report such a dangerous situation, so that the network administrator can be aware of the status of the device.
(4) The contents transmitted to the network administrator are reported by encrypted communication, and therefore the contents will not be leaked to a third party.
(5) The network administrator can change the threshold number of unsuccessful accesses and the network administrator's IP address used for receiving reports, and therefore the degree of freedom is enhanced.

According to one embodiment of the present invention, a network communication device corresponds to IP communication and is capable of performing IPsec communication, and the network communication device includes a setting unit configured to obtain and set an operation mode specified by an administrator user; a detecting unit configured to detect a communication error caused by an incorrect portion in an IPsec setting; and a changing unit configured to change the IPsec setting, based on the operation mode set by the setting unit, to correct the incorrect portion or to cancel the IPsec communication, in the event that the communication error is detected.

Additionally, according to one embodiment of the present invention, in the network communication device, the changing unit further includes a correcting unit configured to automatically correct the incorrect portion in the IPsec setting, in the event that the communication error is detected and automatic correction is specified in said operation mode; and a resuming unit configured to resume IPsec connection after the IPsec setting has been corrected.

Additionally, according to one embodiment of the present invention, the network communication device further includes a displaying unit configured to display the incorrect portion in the IPsec setting to a user.

Additionally, according to one embodiment of the present invention, the network communication device further includes a recording unit configured to record, in a log, details of the communication error caused by the incorrect portion in the IPsec setting.

Additionally, according to one embodiment of the present invention, the network communication device further includes a selection unit configured to allow a user to select either the automatic correction or manual correction, in the event that the automatic correction is not specified in said operation mode.

Additionally, according to one embodiment of the present invention, in the network communication device, only the administrator user is allowed to select the automatic correction.

Additionally, according to one embodiment of the present invention, in the network communication device, a corresponding IPsec setting entry is searched for with an IP address of another device with which the IP communication is performed, and an item with the highest priority included in the corresponding IPsec setting entry is determined to be one to be corrected.

Additionally, according to one embodiment of the present invention, in the network communication device, the automatic correction is not performed by overwriting an existing IPsec setting entry; the automatic correction is performed by adding a new IPsec setting entry.

Additionally, according to one embodiment of the present invention, in the network communication device, in the event that an IPsec setting entry with the highest priority comprises an item that cannot be automatically corrected, a correction is made in an IPsec setting entry with the next highest priority.

Additionally, according to one embodiment of the present invention, in the network communication device, in the event that an IP address of another device with which the IP communication is performed does not correspond to an IPsec setting entry of said network communication device, the changing unit aborts the processing.

Additionally, according to one embodiment of the present invention, in the network communication device, the changing unit further includes a notifying unit configured to notify a temporary cancel address, for an address registered beforehand, in the event that a number of times that the communication error is detected reaches a predetermined number and cancel address notification is specified in said operation mode, wherein the temporary cancel address is used for an instruction to cancel the IPsec communication; and a cancelling unit configured to cancel the IPsec communication in response to receiving said instruction for the temporary cancel address.

According to one embodiment of the present invention, the network communication device performs an IPsec setting error recovery control method.

According to one embodiment of the present invention, an IPsec setting error recovery control program product controls the network communication device.

The present invention is not limited to the specifically disclosed embodiment, and variations and modifications may be made without departing from the scope of the present invention.

The present application is based on Japanese Priority Patent Application No. 2007-039448, filed on Feb. 20, 2007, the entire contents of which are hereby incorporated by reference.

What is claimed is:

1. A network communication device corresponding to IP communication and capable of performing IPsec communication, the network communication device comprising:
   a setting unit configured to obtain and set an operation mode specified by an administrator user;
   a detecting unit configured to detect a communication error caused by an incorrect portion in an IPsec setting;
   an initiator/responder unit configured to determine if the network communication device is an initiator side configured to initiate communication negotiations or is a responder side configured to respond to communication negotiations from an initiator side; and
   a changing unit configured to change the IPsec setting, based on the operation mode set by the setting unit, to correct the incorrect portion or to cancel the IPsec communication, in the event that the communication error is detected, wherein:
      when the network communication device is an initiating side, the changing unit corrects the IPsec setting and the network communication device attempts a reconnection process; and
      when the network communication device is the responder side, the network communication device is configured to respond to a communication using a different encryption method, said IPsec setting is corrected, and the network communication device attempts a reconnection process.

2. The network communication device according to claim 1, wherein the changing unit further comprises:
   a correcting unit configured to automatically correct the incorrect portion in the IPsec setting, in the event that the communication error is detected and automatic correction is specified in said operation mode; and
   a resuming unit configured to resume the IPsec communication after the IPsec setting has been corrected.

3. The network communication device according to claim 2, further comprising:
   a displaying unit configured to display the incorrect portion in the IPsec setting to a user.

4. The network communication device according to claim 2, further comprising:
   a recording unit configured to record, in a log, details of the communication error caused by the incorrect portion in the IPsec setting.

5. The network communication device according to claim 2, further comprising:
   a selection unit configured to allow a user to select either the automatic correction or manual correction, in the event that the automatic correction is not specified in said operation mode.

6. The network communication device according to claim 5, wherein:
   only the administrator user is allowed to select the automatic correction.

7. The network communication device according to claim 2, wherein:
   a corresponding IPsec setting entry is searched for with an IP address of another device with which the IP communication is performed, and an item with the highest priority included in the corresponding IPsec setting entry is determined to be one to be corrected.

8. The network communication device according to claim 2, wherein:
   the automatic correction is not performed by overwriting an existing IPsec setting entry;
   the automatic correction is performed by adding a new IPsec setting entry.

9. The network communication device according to claim 2, wherein:
   in the event that an IPsec setting entry with the highest priority comprises an item that cannot be automatically corrected, a correction is made in an IPsec setting entry with the next highest priority.

10. The network communication device according to claim 2, wherein:
    in the event that an IP address of another device with which the IP communication is performed does not correspond to an IPsec setting entry of said network communication device, the changing unit aborts the processing.

11. The network communication device according to claim 1, wherein the changing unit further comprises:
    a notifying unit configured to notify, to an address registered beforehand, a temporary cancel address in the event that a number of times that the communication error is detected reaches a predetermined number and cancel address notification is specified in said operation mode, wherein the temporary cancel address is used for an instruction to cancel the IPsec communication; and
    a cancelling unit configured to cancel the Pse communication in response to receiving said instruction for the temporary cancel address, 12. An IPsec setting error recovery control method performed by a network communication device corresponding to IP communication and capable of performing IPsec communication, the IPsec setting error recovery control method comprising:

a setting step of obtaining and setting an operation mode specified by an administrator user;

a detecting step of detecting a communication error or caused by an incorrect portion in an IPsec setting;

an initiator/responder determining step determining if the network communication device is an initiator side configured to initiate communication negotiations or is a responder side configured to respond to communication negotiations from an initiator side; and a changing step of changing the IPsec setting, based on the operation mode set at the setting step, to correct the incorrect portion or to cancel the IPsec communication, in the event that the communication error is detected; wherein:

when the network communication device is an initiating side, the IPsec setting is corrected, and the network communication device attempts a reconnection process; and when the network communication device is the responder side, the network communication device is configured to respond to a communication using a different ener tion method said IPsec settin is co ct d and the network communication device attempts a reconnection process.

13. The IPsec setting error recovery control method according to claim 12, wherein the changing step further comprises:

a correcting step of automatically correcting the incorrect portion in the IPsec setting, in the event that the communication error is detected and automatic correction is specified in said operation mode; and a resuming step of resuming the IPsec communication after the IPsec setting has been corrected.

14. The IPsec setting error recovery control method according to claim 13, further comprising:

a displaying step of displaying the incorrect portion in the IPsec setting to a user.

15. The IPsec setting error recovery control method according to claim 13, further comprising:

a recording step of recording, in a log, details of the communication error caused by the incorrect portion in the IPsec setting.

16. The IPsec setting error recovery control method according to claim 13, further comprising:

a selection step of allowing a user to select either the automatic correction or manual connection, in the event that the automatic correction is not specified in said operation mode.

17. The IPsec setting error recovery control method according to claim 13, wherein:

a corresponding IPsec setting entry is searched for with an IP address of another device with which the IP communication is performed, and an item with the highest priority included in the corresponding IPsec setting entry is determined to be one to be corrected.

18. The IPsec setting error recovery control method according to claim 13, wherein:

in the event that an IPsec setting entry with the highest priority comprises an item that cannot he automatically corrected, a correction is made in an IPsec setting entry with the next highest priority.

19. The IPsec setting error recovery control method according to claim 12, wherein the changing step further comprises:

a notifying step of notifying, to an address registered beforehand, a temporary cancel address in the event that a number of times that the communication error is detected reaches a predetermined number and cancel address notification is specified in said operation mode, wherein the temporary cancel address is used for an instruction to cancel the IPsec communication; and a cancelling step of cancelling the IPsec communication in response to receiving said instruction for the temporary cancel address.

20. An IPsec setting error cowry control program product stored in a non-transitory form in a computer storage medium for controlling a network communication device corresponding to IP communication and capable of performing IPsec communication, the IPsec setting error recovery control program product comprising instructions for causing a computer to perform:

a setting step of obtaining and setting an operation mode specified by an administrator user;

a detecting step of detecting a communication error caused by an incorrect portion in an IPsec setting;

an initiator/responder determining ster dcterminin if the network communication device is an initiator side configured to initiate communication negotiations or is a responder side confi ured to res and to communication negotiations from an initiator side; and a changing step of changing the IPsec setting, based on the operation mode set at the setting step, to correct the incorrect portion or to cancel the IPsec communication, in the event that the communication error is detected; wherein:

when the network communication device is an initiating side, the IPsec setting is corrected and the network communication device attempts a reconnection process; and when the network communication device is the responder side, the network communication device is configured to res ond to a communication us in a different encryption method, said IPsec setting is corrected, and the network communication device attempts a reconnection process.

* * * * *